United States Patent
Lee et al.

(10) Patent No.: US 10,546,314 B2
(45) Date of Patent: Jan. 28, 2020

(54) SYSTEMS AND METHODS FOR PROVIDING PROMOTION SHARING AMONG CONSUMERS

(71) Applicant: Groupon, Inc., Chicago, IL (US)

(72) Inventors: Injae Lee, Bellevue, WA (US); Selvam Velmurugan, Seattle, WA (US); Vinayak Hegde, Bellevue, WA (US)

(73) Assignee: GROUPON, INC., Chicago, IL (US)

( * ) Notice: Subject to any disclaimer, the term of this patent is extended or adjusted under 35 U.S.C. 154(b) by 27 days.

(21) Appl. No.: 16/019,584

(22) Filed: Jun. 27, 2018

(65) Prior Publication Data

US 2019/0005529 A1 Jan. 3, 2019

Related U.S. Application Data

(63) Continuation of application No. 13/930,833, filed on Jun. 28, 2013, now Pat. No. 10,032,182.

(51) Int. Cl.
*G06Q 30/02* (2012.01)

(52) U.S. Cl.
CPC ..... *G06Q 30/0221* (2013.01); *G06Q 30/0207* (2013.01); *G06Q 30/0214* (2013.01); *G06Q 30/0225* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 4,876,592 A | 10/1989 | Von Kohorn |
| 5,025,372 A | 6/1991 | Burton et al. |
| 5,053,957 A | 10/1991 | Suzuki |
| 5,056,019 A | 10/1991 | Schultz et al. |
| 5,287,268 A | 2/1994 | McCarthy |
| 5,297,026 A | 3/1994 | Hoffman |
| 5,466,919 A | 11/1995 | Hovakimian |
| 5,537,314 A | 7/1996 | Kanter |
| 5,621,640 A | 4/1997 | Burke |
| 5,649,116 A | 7/1997 | McCoy et al. |
| 5,710,886 A | 1/1998 | Christensen et al. |
| 5,806,045 A | 9/1998 | Biorge et al. |

(Continued)

OTHER PUBLICATIONS

Glaser, Martha, "Buying Groups What Have You Done for Me Lately," Drug Topics, Jun. 8, 1992, vol. 136, No. 11, pp. 48-51, ISSN: 0012-6616.

*Primary Examiner* — Vincent M Cao
(74) *Attorney, Agent, or Firm* — Alston & Bird LLP

(57) ABSTRACT

Systems, apparatus, and methods for providing promotion sharing between consumers are discussed herein. Some embodiments may include a system including circuitry configured to generate an incentive token for a promotion of a merchant. The incentive token may be associated with a first consumer account and provided to a first consumer device associated with the first consumer account for sharing with other consumers. Upon receiving the incentive token form a second consumer device associated with a second consumer account, the circuitry may be configured to enable the second consumer account to receive an incentive value of the incentive token if various conditions are satisfied. For example, the second consumer may be asked to purchase the promotion, create a new consumer account, or the like.

21 Claims, 8 Drawing Sheets

(56) References Cited

U.S. PATENT DOCUMENTS

| | | | |
|---|---|---|---|
| 6,014,645 A | 1/2000 | Cunningham | |
| 6,018,718 A | 1/2000 | Walker et al. | |
| 6,101,484 A | 8/2000 | Halbert et al. | |
| 6,128,599 A | 10/2000 | Walker et al. | |
| 6,260,024 B1 | 7/2001 | Shkedy | |
| 6,332,126 B1 | 12/2001 | Peirce et al. | |
| 6,965,869 B1 | 11/2005 | Tomita et al. | |
| 2007/0179885 A1* | 8/2007 | Bird | G06Q 20/04 705/39 |
| 2007/0265921 A1* | 11/2007 | Rempe | G06Q 30/02 705/14.16 |
| 2008/0052169 A1* | 2/2008 | O'Shea et al. | G06Q 20/10 705/14.17 |
| 2009/0132366 A1* | 5/2009 | Lam | G06Q 30/02 705/14.36 |
| 2009/0327308 A1 | 12/2009 | Carter et al. | |
| 2010/0211452 A1* | 8/2010 | D'Angelo et al. | G06Q 30/02 705/14.38 |
| 2010/0287044 A1* | 11/2010 | Mason | G06Q 20/387 705/14.13 |
| 2011/0010234 A1* | 1/2011 | Lindelsee | G06Q 20/32 705/14.23 |
| 2011/0251880 A1 | 10/2011 | Butler et al. | |
| 2012/0036003 A1* | 2/2012 | Tong | G06O 30/0207 705/14.39 |
| 2012/0047003 A1* | 2/2012 | Hammad | G06Q 30/0207 705/14.1 |
| 2012/0215597 A1 | 8/2012 | Ross | |
| 2012/0303435 A1* | 11/2012 | Rawat | G06Q 30/0226 705/14.27 |
| 2013/0006738 A1 | 1/2013 | Horvitz et al. | |
| 2013/0103481 A1 | 4/2013 | Carpenter et al. | |

\* cited by examiner

600

Share the happiness!

You've recently recommended the deal from   MERCHANT   Why not share the experience with your friends? The treat is on us. Share the $7 promo code below with your friends. The promo code will expire after 10 redemptions. So share it wisely.

— 606

*Share this promocode with up to 10 friends.   — 604   — 602

HKTH_UmF3IFZIZ2FuIENhZmU

Here's the deal that <u>you recommended</u> in case you forgot.

— 608

IMPRESSION

Promotion Name
Merchant

FIG. 6

Order Details — 704

| Description — 706 | Quantity | Price | Total |
|---|---|---|---|
| Cooking class for three - Coupon Subtitle | 1 | x $72 | = $72.00 |

☑ Use a promotion or gift code

HKTH_UmF3IFZIZ2FuIENhzmU — 702

[Apply] — 712

My Price: $72.00

Account Information 🔒

Pay With Existing Card    Card Number

◉ card type    ****-1111      edit card
— 708

Use new card • — 710

[Complete Order]

FIG. 7

Order Details

| Description | 706 | Quantity | Price | Total 804 |
|---|---|---|---|---|
| Cooking class for three - Coupon Subtitle ⇕ | | 1 x | $72 = | $72.00 |

☑ Use a promotion or gift code

802
Incentive Value:    − $7.00

806
My Price: $65.00

Account Information 🔒

Pay With Existing Card    Card Number
◉ card type              ****-1111                    edit card
   — 708
Use new card •   — 710

[ Complete Order ]

FIG. 8

SYSTEMS AND METHODS FOR PROVIDING PROMOTION SHARING AMONG CONSUMERS

CROSS REFERENCE TO RELATED APPLICATION

This application is a continuation of U.S. application Ser. No. 13/930,833, titled "SYSTEMS AND METHODS FOR PROVIDING PROMOTION SHARING AMONG CONSUMERS" filed Jun. 28, 2013, the content of which is incorporated herein by reference in its entirety.

FIELD

Embodiments of the invention relate, generally, to techniques for providing promotions to consumer devices.

BACKGROUND

Via electronic networks (e.g., the Internet), promotional systems provide promotions associated with merchants to consumer devices. After having a good experience with a promotion (e.g., by receiving a good and/or service in return for redemption of the promotion), a consumer may be interested in sharing the promotion with friends, family, and/or any other consumers. In this regard, areas for improving current systems have been identified.

BRIEF SUMMARY

Through applied effort, ingenuity, and innovation, solutions to improve such systems have been realized and are described herein. Some embodiments may provide for a promotion and marketing system configured to provide promotions to consumers. For example, the system may include circuitry configured to: generate an incentive token for a promotion of a merchant, wherein the incentive token is associated with an incentive value; associate the incentive token with a first consumer account; provide the incentive token to a first consumer device associated with the first consumer account, wherein the first consumer account is prohibited from receiving the incentive value; receive the incentive token from a second consumer device associated with a second consumer account; determine whether the second consumer account is authorized to receive the incentive value; and in response to determining the second consumer account is authorized to receive the incentive value, enable the second consumer account to receive the incentive value.

In some embodiments, the circuitry being configured to determine whether the second consumer account is authorized to receive the incentive value may include the circuitry configured to: determine an incentive count indicating a number of incentives available for the incentive token before providing the incentive token to the first consumer device; determine whether the incentive token count indicates that one or more incentives are available for the incentive token after receiving the incentive token from the second consumer device; and in response to determining that the incentive count indicates that one or more incentives are available for the incentive token: enable the second consumer account to receive the incentive value; and reduce the incentive count for the incentive token. For example, the incentive token may be configured to be shared among consumer accounts via social networking systems.

In some embodiments, the circuitry being configured to determine whether the second consumer account is authorized to receive the incentive value may include the circuitry configured to determine whether the second consumer has created the second consumer account to receive the inventive value, whether the first consumer account is unassociated with the second consumer device and is different than second consumer account, whether the second consumer has purchased the promotion, and/or whether the second consumer has redeemed the promotion.

In some embodiments, the circuitry may be further configured to: receive redemption data indicating that the promotion has been redeemed by the first consumer; and provide a review request for a review of the promotion to the first consumer device after receiving the redemption indication. The circuitry may be further configured to: receive a review for the promotion from the first consumer device; determine whether the review was a positive review; and in response to determining that the review was a positive review, generate the incentive token for the promotion. For example, the circuitry may be configured to: send a request for a binary consumer answer regarding whether the merchant is recommended to the first consumer device; and determine that the review was a positive review based on the binary consumer answer indicating that the merchant is recommended.

In some embodiments, the circuitry may be further configured to associate the first consumer account with the second consumer account for future marketing after receiving the incentive token from the second consumer device. The circuitry may be configured to track market influence of the first consumer based on an incentive token count indicating a number of incentives available for the incentive token. Furthermore, in some embodiments, the incentive token count for the incentive token may be determined based on the market influence of the first consumer before providing the incentive token to the first consumer device (e.g., for sharing with the second consumer device). The circuitry may be further configured to provide one or more promotions to the first consumer device based on the market influence of the first consumer.

Some embodiments may provide for a machine-implemented method. For example, the method may include: generating an incentive token for a promotion of a merchant, wherein the incentive token is associated with an incentive value; associating the incentive token with a first consumer account; providing the incentive token to a first consumer device associated with the first consumer account, wherein the first consumer account is prohibited from receiving the incentive value; receiving the incentive token from a second consumer device associated with a second consumer account; determining, by a processor, whether the second consumer account is authorized to receive the incentive value; and in response to determining the second consumer account is authorized to receive the incentive value, enabling the second consumer account to receive the incentive value.

In some embodiments, the method may further include: determining an incentive count indicating a number of incentives available for the incentive token before providing the incentive token to the first consumer device; determining whether the incentive token count indicates that one or more incentives are available for the incentive token after receiving the incentive token from the second consumer device; and in response to determining that the incentive count indicates that one or more incentives are available for the incentive token: enabling the second consumer account to receive the incentive value; and reducing the incentive count for the incentive token. For example, the incentive token may be configured to be shared among consumer accounts via social networking systems.

In some embodiments, determining whether the second consumer account is authorized to receive the incentive value may include determining whether the second consumer has created the second consumer account to receive the inventive value, determining whether the first consumer account is unassociated with the second consumer device and is different than second consumer account, determining whether the second consumer has purchased the promotion, and/or determining whether the second consumer has redeemed the promotion.

In some embodiments, the method may further include: receiving redemption data indicating that the promotion has been redeemed by the first consumer; and providing a review request for review of the promotion to the first consumer device after receiving the redemption indication. The method may further include: receiving a review for the promotion from the first consumer device; determining whether the review was a positive review; and in response to determining that the review was a positive review, generate the incentive token for the promotion. For example, some embodiments of the method may include: sending a request for a binary consumer answer regarding whether the merchant is recommended to the first consumer device; and determining that the review was a positive review based on the binary consumer answer indicating that the merchant is recommended.

In some embodiments, the method may further include associating the first consumer account with the second consumer account for future marketing after receiving the incentive token from the second consumer device. The market influence of the first consumer may be tracked based on an incentive token count indicating a number of incentives available for the incentive token. In some embodiments, the method may further include determining the incentive token count based on the market influence of the first consumer before providing the incentive token to the first consumer device. Furthermore, the method may include providing one or more promotions to the first consumer device based on the market influence of the first consumer.

Some embodiments may include apparatus, devices, hardware and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
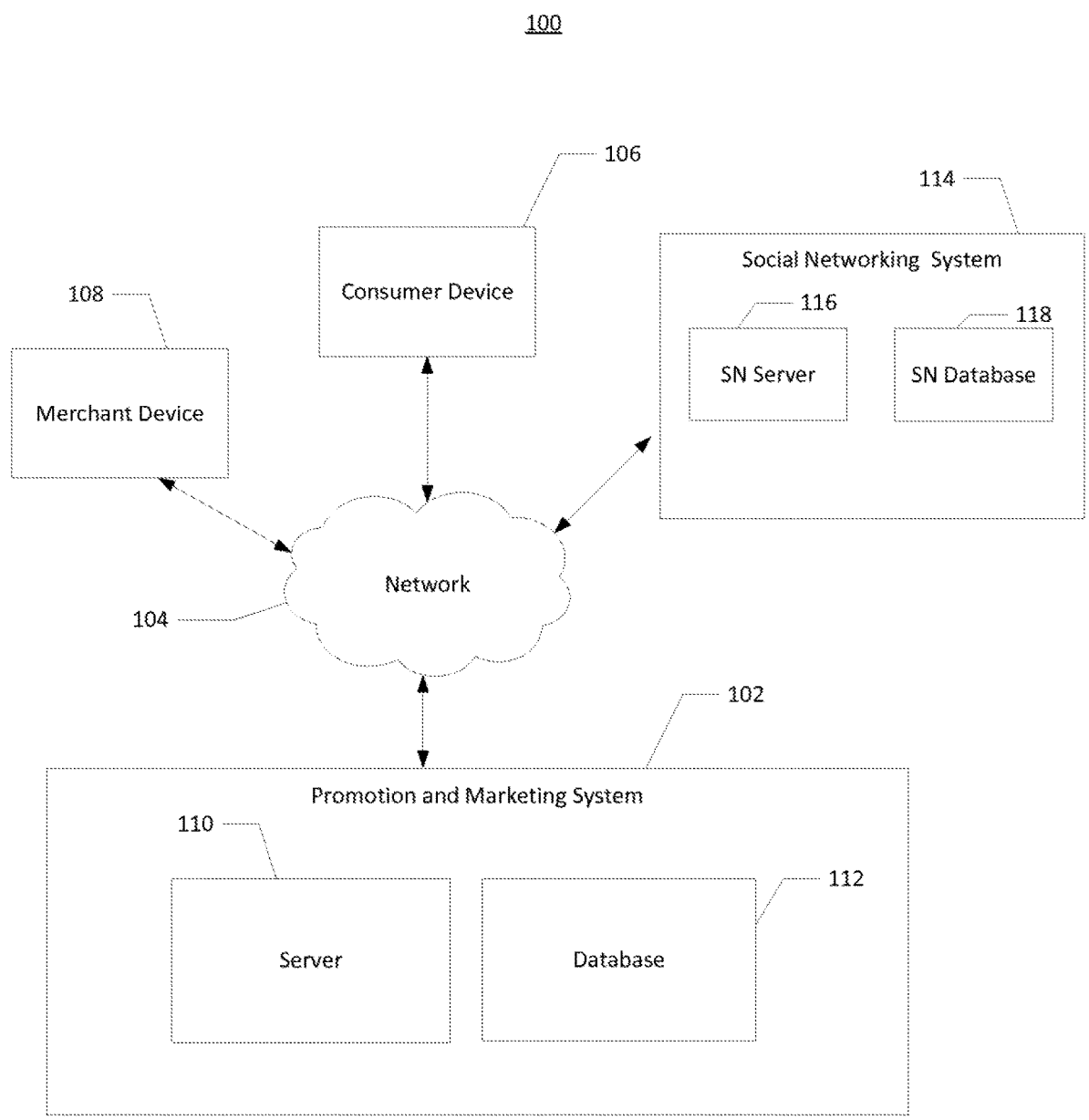
Figure 2:
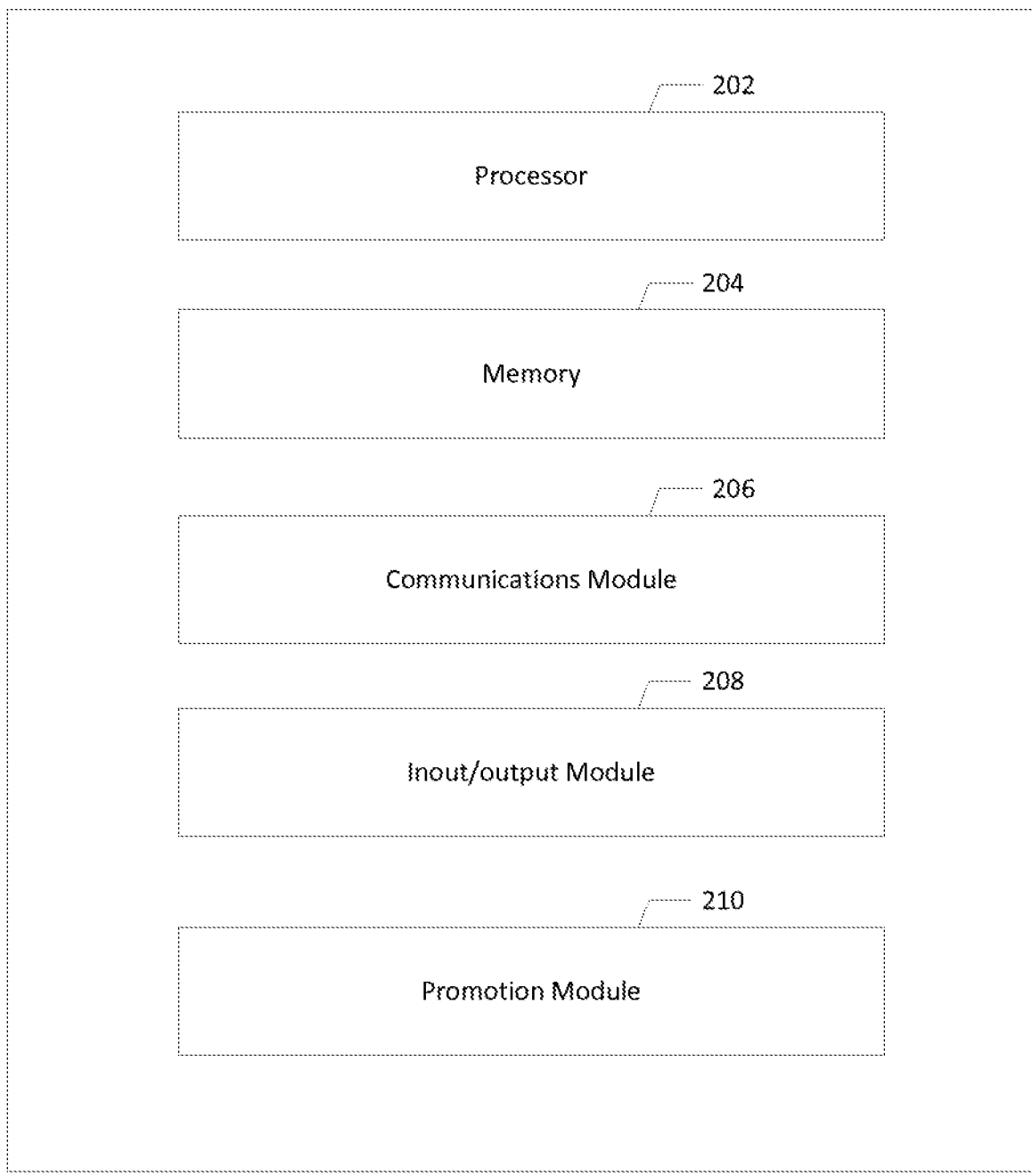
Figure 3:
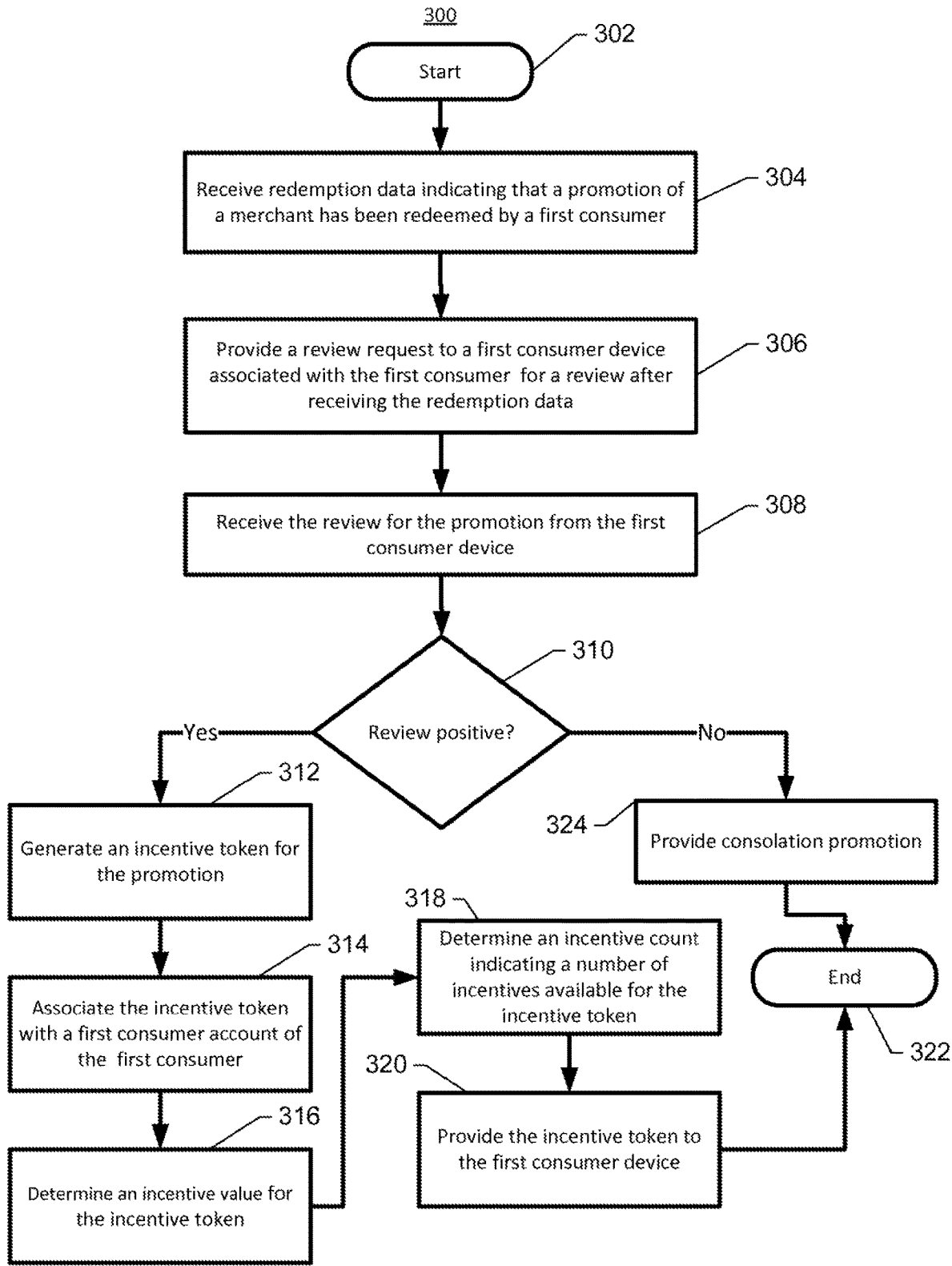
Figure 4:
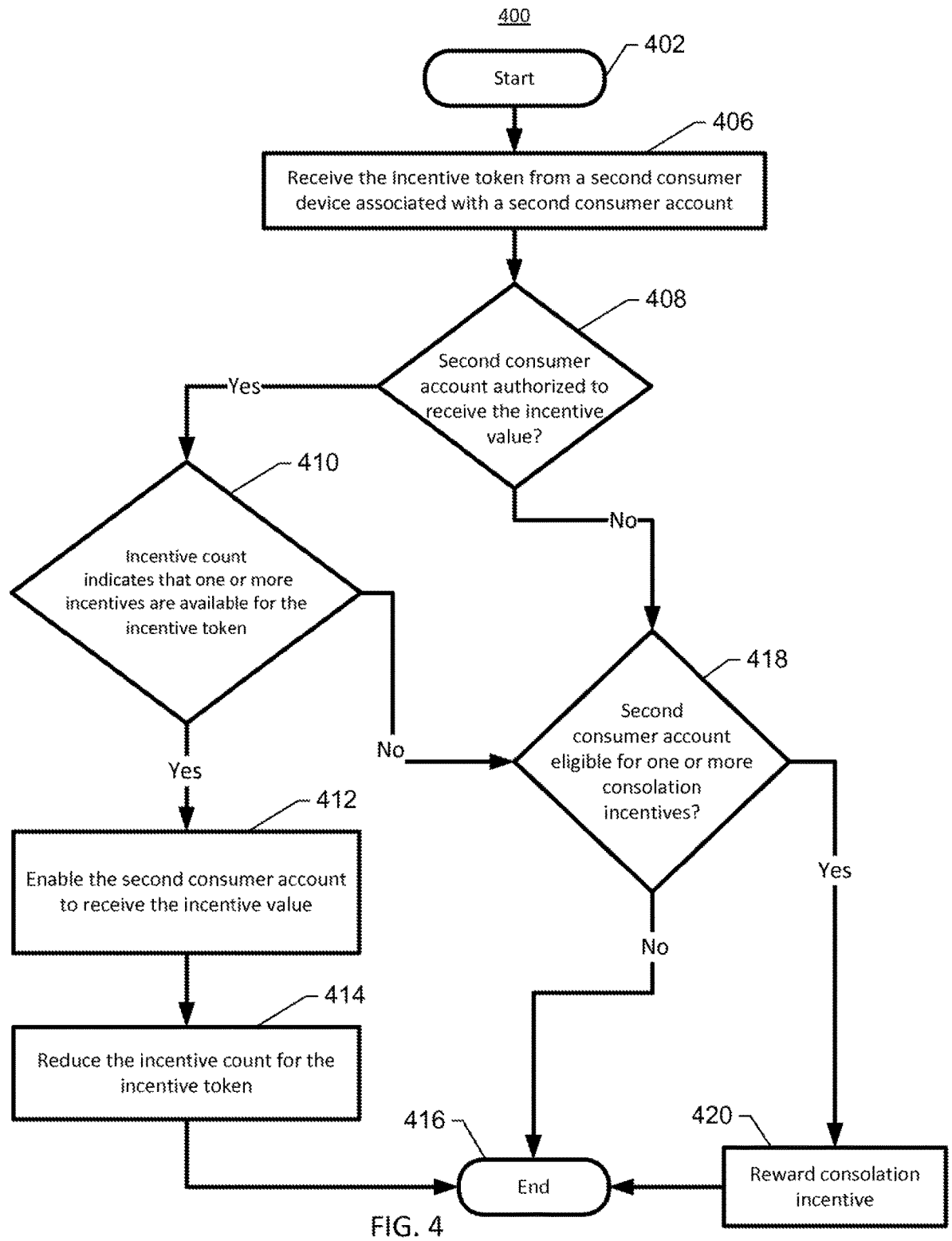
Figure 5:
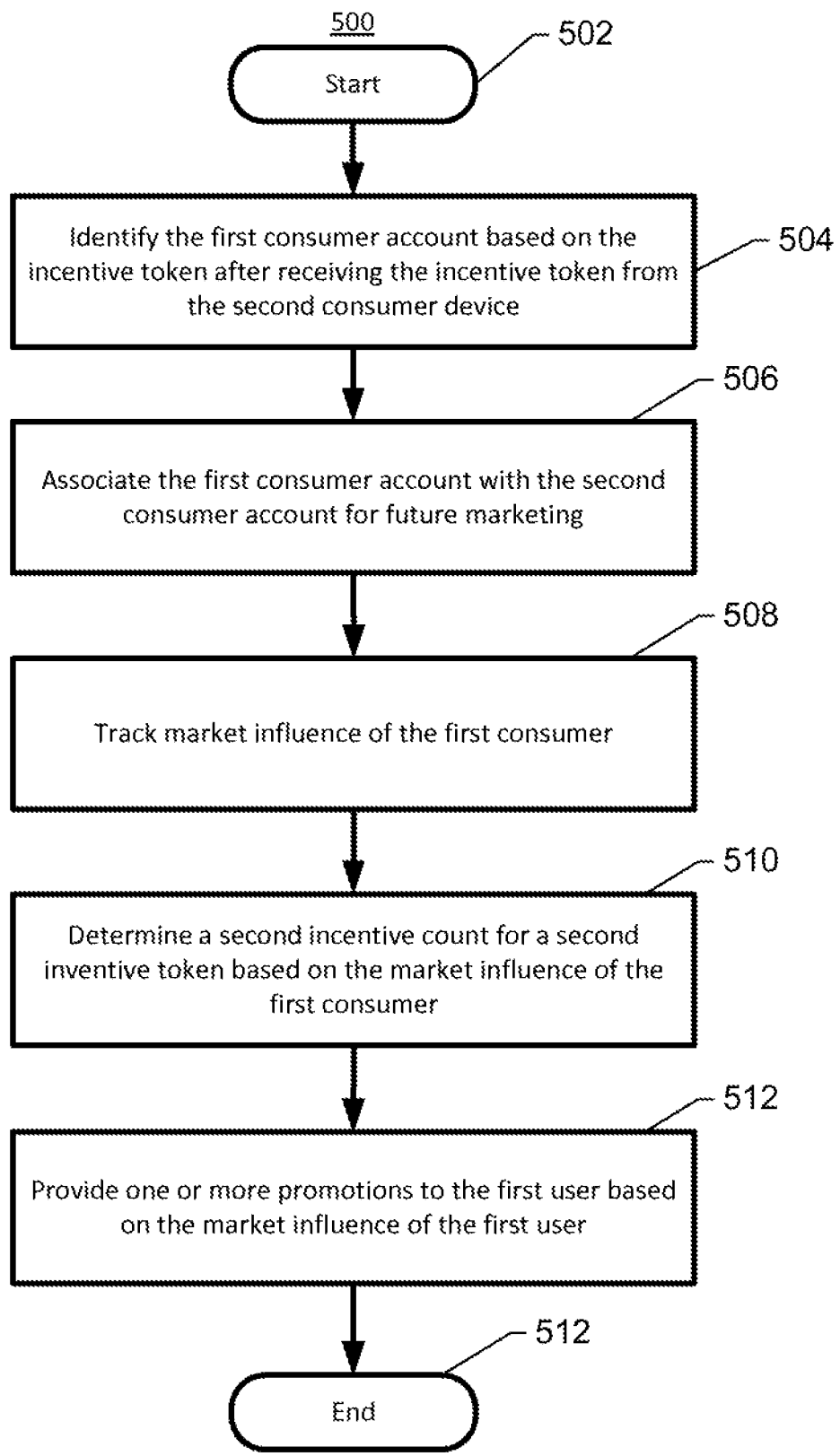

Having thus described some embodiments in general terms, reference will now be made to the accompanying drawings, which are not necessarily drawn to scale, and wherein:

FIG. 1 shows an example system, in accordance with some embodiments;

FIG. 2 shows example circuitry, in accordance with some embodiments;

FIG. 3 shows an example of a method for providing an incentive token, performed in accordance with some embodiments;

FIG. 4 shows an example of a method for receiving an incentive token, performed in accordance with some embodiments;

FIG. 5 shows an example of a method for tracking market influence of a consumer based on an incentive token, performed in accordance with some embodiments;

FIG. 6 shows an example incentive token display, in accordance with some embodiments;

FIG. 7 shows an example incentive value redemption display, in accordance with some embodiments; and FIG. 8 shows an example incentive value redemption confirmation display, in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the another device or may be received indirectly via one or more intermediary devices, such as, for example, one or more servers, relays, routers, network access points, base stations, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or the like.

As used herein, the term "method" refers to one or more steps that may be performed by a device, apparatus, system, circuitry, one or more processors, or the like. Where an example method is shown as including more than one step, it will be appreciated that the steps may be performed in different orders than as shown in the example and that not all steps are necessarily required. Furthermore, some methods are described herein as being performed by example structures for clarity and are not limited to those structures (e.g., a particular server, device, apparatus, etc.) in some embodiments.

BRIEF OVERVIEW

Methods, systems, apparatus and computer program products described herein are operable for providing promotion sharing between consumers. A "promotion," as used herein, may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion.

In some embodiments, a promotion and marketing system may be configured to provide sharing of promotions between consumers. For example, an incentive token associated with a promotion may be provided to a first consumer device (e.g., associated with a first consumer and/or a first consumer account) as the mechanism for sharing the promotion with other consumer devices (e.g., associated with other consumers and/or consumer accounts). An "incentive token," as used herein, may include one or more keys, random or pseudorandom data, codes, and/or other types of tokens.

After receiving the incentive token, the first consumer may share the incentive token with a second consumer device (e.g., associated with a second consumer and/or a second consumer account), such as by any suitable communication channels including social networking systems, email, short messaging service (SMS) text, etc. In some embodiments, the incentive token may be shared with and/or as part of an impression provided by the system. An "impression," as used herein, may include a communication, a display, or other perceived indication, such as a flyer, social networking system post, print media, e-mail, text message, application alert, mobile applications, other type of electronic interface or distribution channel and/or the like, of one or more promotions.

The system may receive the incentive token from the second consumer device. Various determinations may be performed to determine whether the second consumer account is authorized to receive an incentive value associated with the incentive token. For example, the second consumer may be required to create the second consumer account with the system (e.g., registration), purchase the promotion, and/or redeem the promotion before receiving and/or redeeming the incentive value. In that sense, the system may be configured to incentivize various consumer actions using the incentive token such as new consumer registration, promotion sharing and/or promotion purchase.

In some embodiments, upon consumer purchase of a promotion, the consumer may be provided with an instrument for redeeming the promotion. An "instrument," as used herein, may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience.

In some embodiments, "market influence" of a consumer may be determined and/or tracked based on the incentive token. For example, consumers that are more successful at sharing incentive tokens with other consumers may be determined to have greater market influence. In some embodiments, the market influence of consumers may be used to determine eligible promotions and/or various incentive token parameters.

Exemplary System Architecture

FIG. 1 shows an example system 100, in accordance with some embodiments. System 100 may include promotion and marketing system 102 (or "system 102"), network 104, consumer device 106, merchant device 108, and social networking system 114. System 102, consumer device 106, merchant device 108, and social networking system 114 may be configured to communicate via network 104.

System 102 may include server 110 and database 112. Server 110 may include circuitry, networked processors, or the like configured to perform some or all of the server-based processes described herein related to promotion sharing and may be any suitable network server and/or other type of processing device. In some embodiments, system 102 may function as a "cloud" with respect to the consumer device 106 and/or merchant device 108. In that sense, server 110 may include several servers performing interconnected and/or distributed functions. To avoid unnecessarily overcomplicating the disclosure, server 110 is shown and described herein as a single server.

Database 112 may be any suitable network storage device configured to store some or all of the information described herein. For example, database 112 may be configured to store consumer information and/or promotion information. As such, database 112 may include, for example, one or more database systems, backend data servers, network databases, cloud storage devices, etc. To avoid unnecessarily overcomplicating the disclosure, database 112 is shown and described herein as a single database.

Social networking system 114 may include social networking server 116 and social networking database 118. Social networking system 114 may be configured to provide a (e.g., network based) social networking system. For example, social networking system 114 may be configured to provide interfaces that allow users (e.g., via consumer device 106) to post content for sharing with other users, such as on a user post, feed, newsfeed, user wall, user profile, user timeline, or the like. In some embodiments, the content may include one or more promotions, impressions, and/or incentive tokens. Here, a second consumer device may receive the one or more promotions, impressions, and/or incentive tokens from a first consumer device via social networking system 114. In some embodiments, system 102 may be configured to provide the networked based social networking system.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer, such as a consumer with a consumer account provided by system 102. Although a single consumer device 106 is shown, system 100 may include any number of consumer devices that may be associated with various other consumers. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, point-of-sale device, or the like.

Merchant device 108 may be associated with a merchant. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device. In some embodiments, system 102 may be configured to receive promotion data indicating a promotion for goods and/or services and/or one or more parameters of the promotion (e.g., target audience, timing, purchase value, promotional value, residual value, etc.). System 102 may be further configured to generate and/or provide one or more impressions for the promotion to consumer device 102.

FIG. 2 shows a schematic block diagram of example circuitry 200, some or all of which may be included in system 102, server 110, database 112, user device 106, and merchant device 108. In accordance with some example embodiments, circuitry 200 may include various means, such as one or more processors 202, memories 204, communications modules 206, and/or input/output modules 208.

In some embodiments, such as when circuitry 200 is included in system 102, promotion module 210 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, Wi-Fi (e.g., a 802.11 protocol, Bluetooth, etc.), radio frequency systems (e.g., 900 MHz, 1.4 GHz, and 5.6

GHz communication systems), infrared, GSM, GSM plus EDGE, CDMA, quadband, and other cellular protocols, VOIP, or any other suitable protocol Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, promotion module 210 may also or instead be included and configured to perform the functionality discussed herein related providing promotions. In some embodiments, some or all of the functionality of promotion module 210 may be performed by processor 202. In this regard, the example processes and algorithms discussed herein can be performed by at least one processor 202 and/or promotion module 210. For example, non-transitory computer readable storage media can be configured to store firmware, one or more application programs, and/or other software, which include instructions and other computer-readable program code portions that can be executed to control processors of the components of system 200 to implement various operations, including the examples shown above. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Promotion Sharing Between Consumers

FIG. 3 shows an example of a method 300 for providing an incentive token, performed in accordance with some embodiments. Method 300 may be performed by system 102 (e.g., server 110), as shown in FIG. 1. Method 300 is described as being performed by server 110, however, other suitable structures (e.g., one or more servers, a networked device, circuitry, etc.) may also be used in various embodiments.

Method 300 may begin at 302 and proceed to 304, where server 110 may be configured to receive redemption data indicating that a promotion of a merchant has been redeemed by a first consumer. In some embodiments, the redemption data may be received from merchant device 108 and/or consumer device 106. For example, the first consumer and/or first consumer account associated with the first consumer may be provided an instrument for the promotion. Upon the first consumer providing the instrument to the merchant (e.g., an electronic certificate sent from consumer device 106 to merchant device 108, a display for visual and/or electronic inspection (e.g., barcode), a printed medium, etc.), merchant device 108 and/or consumer device 106 may be configured to send the redemption data to server 110.

At 306, server 110 may be configured to provide a review request to a first consumer device associated with the first consumer for a review. The review may include review data indicating an evaluation of the promotion and/or of the merchant. In an example where the promotion was a discounted restaurant dinner, the review may indicate a consumer rating of the experience in terms of one or more of price, cleanliness, speed, food quality, service, overall quality, or the like. In some embodiments, server 110 may be configured to provide a survey that may be answered to provide the review. Server 110 may send a request for a binary consumer answer regarding whether the promotion and/or merchant is recommended to the first consumer device. For example, the request may include a preliminary message and/or question such as "would you recommend the merchant?" that may only be answered positively or negatively, such as by providing a binary (e.g., yes/no) user input display. Upon receiving the binary consumer answer, the first consumer device may be provided a full and/or more detailed survey (e.g., a survey webpage).

In some embodiments, server 110 may be configured to generate the review requests and/or surveys by tracking promotion redemptions. Review request messages may be generated (e.g., each hour) and sent (e.g., each day), such as by separate processes and/or jobs. In some embodiments, server 110 and/or one or more dedicated messaging servers may be configured to provide the review requests and/or surveys to consumer device 106, as well as promotions and/or impressions of the promotions. The messages may be sent via any suitable means including email, text, promotion application, social networking message, etc. to consumer device 106.

At 308, server 110 may be configured to receive the review from the first consumer device. For example, the review of the promotion may include the binary consumer answer regarding whether the promotion and/or merchant is recommended. Additionally and/or alternatively, the review may include answers and/or ratings in response to a survey.

At 310, server 110 may be configured to determine whether the review was a positive review. For example, the determination may be based on the binary consumer answer regarding whether the promotion and/or merchant is recommended. Here, the request for the binary consumer answer may be separated from a more detailed survey to ensure that a greater number of consumers provide an answer. Additionally and/or alternatively, whether the review was a positive review may be determined based on one or more answers and/or ratings of the review. For example, a weighted, multi-factor score may be determined based on the review and compared with a consumer positive review threshold amount.

In response to determining that the review was positive, method 300 may proceed to 312, where server 110 may be configured to generate an incentive token for the promotion. As discussed above, the incentive token may provide a mechanism for the first consumer to share the promotion with other consumers. The incentive token may be generated in response to a positive review because consumers are more likely to recommend a promotion they enjoyed. In some embodiments, however, server 110 may additionally or alternatively be configured to generate the incentive taken at other times, such as regardless of whether a review was received from the first consumer and/or was a positive review. The incentive token may include one or more keys, random or pseudorandom data, codes, and/or other types of tokens. In some embodiments, incentive tokens generated by server 110 may be uniquely identifying (e.g., associated with different data) with respect to each other.

At 314, server 110 may be configured to associate the incentive token with a first consumer account of the first consumer. As such, when the incentive token is later received from a second consumer device associated with a second consumer, the first consumer may be identified as having shared the incentive token with the second consumer. In some embodiments, server 110 may be further configured to associate the incentive token with the promotion.

At 316, server 110 may be configured to determine an incentive value for the incentive token. The incentive value may indicate an incentive and/or reward that may be provided to consumers using the incentive token. For example, the incentive value may be in the form of a credit that can be exchanged for promotions and/or other goods and services from system 102. In other examples, the incentive value may be a monetary amount, discount, reward, or the like that is separate the promotion.

At 318, server 110 may be configured to determine an incentive count indicating a number of incentives available for the incentive token. The number of incentives may refer to a number of incentive values that may be received and/or redeemed for the incentive token. An incentive count of 10, for example, may allow the first consumer to share the incentive value with up to 10 friends or family. In some embodiments, as discussed below in connection with method 500 and FIG. 5, the incentive count may be determined based on market influence of the user as determined based on tracking incentive tokens and incentive value redemptions.

At 320, server 110 may be configured to provide the incentive token to the first consumer device. For example, the incentive token may be provided to the first consumer device for sharing with one or more other consumer devices. Furthermore, the first consumer account may be prohibited from receiving and/or redeeming the incentive value. The incentive token may be provided via any suitable communication channel(s) including social networking systems, email, short messaging service (SMS) text, etc. FIG. 6 shows an example incentive token display 600, in accordance with some embodiments. Incentive token display 600 may be provided to consumer device 106 (e.g., via email) and may include incentive token 602, incentive count 604, incentive value 606 and impression 608. Impression 608 may include promotion data indicating providing information about the promotion such as the promotion name, merchant, promotion graphic (and/or other media), etc.

In some embodiments, the first consumer device may be configured to provide the incentive token to a second consumer device associated with a second consumer. For example, the incentive token may be shared via a social networking system (e.g., as provided by social networking system 114 and/or system 102) on a user post, feed, newsfeed, user wall, user profile, user timeline, or the like. Furthermore, the incentive token may be shared with an impression of the promotion. In some embodiments, the first consumer device may be configured to provide the incentive token to a second consumer device using other communications channels such as email, short messaging service (SMS) text, etc. In some embodiments, server 110 may be configured to provide the incentive token directly to the second consumer device. Method 300 may then proceed to 322 and end.

Returning to 310, in response to determining that the review was not positive, method 300 may proceed to 324, where server 110 may be configured to provide a consolation promotion to the first consumer device. For example, the consolation promotion, when offered, may compensate the consumer for a bad experience with a promotion. Method 300 may then end at 322.

FIG. 4 shows an example of a method 400 for receiving an incentive token, performed in accordance with some embodiments. Method 400 may be performed by system 102 (e.g., server 110), as shown in FIG. 1. Method 400 is described as being performed by server 110, however, other suitable structures (e.g., one or more servers, a networked device, circuitry, etc.) may also be used in various embodiments.

Method 400 may begin at 402 and proceed to 404, where server 110 may be configured to receive an incentive token (e.g., as provided to a first consumer device) from a second consumer device associated with a second consumer account. As discussed above at 320 of method 300, the incentive token may be shared with the second consumer device by the first consumer device, social networking system 114, and/or server 110. Furthermore, the incentive token may be shared with an impression of the promotion associated with the incentive token.

FIG. 7 shows an example incentive value redemption display 700, in accordance with some embodiments. Server 110 may be configured to provide incentive value redemption display 700 to the second consumer device for receiving the incentive token. Incentive value redemption display 700 may include incentive token input 702 configured to receive the incentive token (e.g., incentive token 602). Upon entering incentive token 602 at incentive token input 702, incentive token 602 may be sent to server 110 responsive to the consumer selecting apply incentive token selection 712. Here, incentive token 602 is shown as a character string that is entered into incentive token input 702. In some embodiments, such as where incentive token 602 is embodied as a file and/or other electronic credential, incentive token input 702 may be configured to receive the incentive token file (e.g., via incentive token upload interface).

At 406, server 110 may be configured to determine whether the second consumer account is authorized to receive the incentive value. In general, one or more requirements may be associated with the incentive token that must be satisfied by the second consumer before the second consumer is authorized to receive the redemption value.

In some embodiments, server 110 may be configured to determine whether the second consumer has created the second consumer account to receive the inventive value. For example, the second consumer may have received the incentive token via a social networking system post provided by social networking system 114. Here, the second consumer may be authorized to receive the incentive value after creating a new consumer account (e.g., the second consumer account). As such, the incentive token may be configured to attract new consumers to system 102.

In some embodiments, server 110 may be configured to determine whether the first consumer account is unassociated with the second consumer device and is different than second consumer account. For example, server 110 may access consumer account data, consumer email address data, financial account data, internet protocol (IP) address data, media access control (MAC) address data, and/or any other consumer identifying data to ensure that the first consumer and second consumer (e.g., as well as their consumer devices and/or consumer accounts) are unassociated. Additionally and/or alternatively, any other suitable security techniques may be used to ensure the consumers may not be authorized to receive the incentive value in a fraudulent manner.

In some embodiments, server 110 may be configured to determine whether the second consumer has purchased and/or redeemed the promotion. For example, the second consumer may be authorized to receive the incentive value when the consumer has purchased the promotion. As shown in FIG. 7, incentive value redemption display 700 including incentive token input 702 may be part of promotion order 704 for promotion 706. Here, the second consumer may be allowed to enter the incentive token in the process of providing payment for promotion 706 with payment account 708. For example, the second consumer may purchase promotion 706 and receive the incentive value upon selecting complete order selection 710.

In response to determining that the second consumer account is authorized to receive the incentive value, method 400 may proceed to 410, where server 110 may be configured to determine whether the incentive token count for the incentive token indicates that one or more incentives (e.g., incentive values) are available for the incentive token. As discussed above, an incentive count of 10, for example, may allow the first consumer to share the incentive value with up to 10 friends or family. Furthermore, each time the incentive value is received and/or redeemed, the incentive count may be decremented until there are no more incentives available.

In response to determining that the incentive count indicates that one or more incentives are available for the incentive token, method 400 may proceed to 412, where server 110 may be configured to enable the second consumer account to receive the incentive value. FIG. 8 shows an example incentive value redemption confirmation display 800, in accordance with some embodiments. Incentive value redemption confirmation display 800 may be provided to the second consumer device to indicate to the second consumer that the incentive value may be received, such as in response to the consumer selecting apply incentive token selection 712 in incentive value redemption display 700. Here, incentive value 802 may be deducted from promotion cost 804 of promotion 806 to determine a final cost 806. Furthermore, the second consumer may purchase promotion 706 for final cost 806 with payment account 708 upon selecting complete order selection 710, thereby redeeming the incentive value. In another example, the incentive value may associate with the second consumer account, such as for credit toward a future redemption of the incentive value.

At 414, server 110 may be configured to reduce the incentive count for the incentive token. For example, after the second consumer has received the incentive value and/or otherwise redeemed the incentive token, the incentive count may be decremented. Here, the first user may be determined to have used up one of the incentives associated with the incentive token. Method 400 may then proceed to 416 and end.

Returning to 408, in response to determining that the second consumer account is not authorized to receive the incentive value and/or in response to determining that the incentive token count indicates that the one or more incentives are unavailable for the incentive token at 410, method 400 may proceed to 418, where server 110 may be configured to determine whether the second consumer is eligible for one or more consolation incentives. For example, the one or more consolation incentives may be provided to entice the user into purchasing a promotion, creating a consumer account, or the like after the incentive values for the incentive token are used up. A consolation incentive may also be associated with a consolation incentive value and may be provided using similar techniques as discussed herein for incentive values.

In response to determining that the second consumer is eligible for the one or more consolation incentives, method 400 may proceed to 420, where server 110 may be configured to reward the consolation incentive to the second consumer account. Method 400 may then proceed to 416 and end.

FIG. 5 shows an example of a method 500 for tracking market influence of a consumer based on an incentive token, performed in accordance with some embodiments. Method 500 may be performed by system 102 (e.g., server 110), as shown in FIG. 1. Method 500 is described as being performed by server 110, however, other suitable structures (e.g., one or more servers, a networked device, circuitry, etc.) may also be used in various embodiments.

Method 500 may begin at 502 and proceed to 504, where server 110 may be configured to identify the first consumer account based on the incentive token after receiving the incentive token from the second consumer device. For example, the incentive token may be associated with the first consumer account at 314 of method 300. As such, the first consumer account may be determined via the association when the incentive token is received from the second consumer device.

At 506, server 110 may be configured to associate the first consumer account with the second consumer account for future marketing. For example, the association may be created after receiving the incentive token from the second consumer device (e.g., at 406 of method 400), after determining that the second consumer account is authorized to receive the incentive value (e.g., at 408 of method 400), determining that the incentive token count indicates that one or more incentives are available for the incentive token (e.g., at 410 of method 400), and/or enabling the second consumer account to receive the incentive value (e.g., at 412 of method 400). The association may indicate that the first consumer successfully recommended the promotion to the second consumer. Via the incentive token, relationships between consumers, consumer popularity, and/or consumer data (e.g., interests, preferences, etc.) may be gathered for future marketing.

At 508, server 110 may be configured to track market influence of the first consumer. For example, the market influence may be based on the associations between the first consumer and other consumers created at 506. A consumer with many successful recommendations (e.g., incentive token redemptions by other consumers) may be determined to have a greater market influence than a consumer with fewer successful recommendations. Here, "market influence" may refer to a consumer's ability successfully share promotions. Furthermore, the consumer's market influence may provide an indication regarding the consumer's social visibility, popularity, online footprint, etc.

At 510, server 110 may be configured to determine a second incentive count for a second incentive token based on the market influence of the first consumer. As discussed at 318 of method 300, the incentive count may be determined based on the market influence of the first consumer. For example, consumers with greater market influence may be provided with a higher incentive count than consumers with lesser market influence.

At 512, server 110 may be configured to provide one or more promotions to the first user based on the market influence of the first user. In some embodiments, the one or more promotions may be special promotions intended for consumers having a strong market influence or the like. For example, a special promotion may be provided as a reward for successfully shared promotions. In another example, the special promotion may be provided as a marketing tool for the promotion, a merchant, and/or system 102 (e.g., to attract new consumer account registration). Method 500 may then end at 512.

CONCLUSION

Many modifications and other embodiments will come to mind to one skilled in the art to which these embodiments pertain having the benefit of the teachings presented in the foregoing descriptions and the associated drawings. For example, the techniques discussed herein involving promotion sharing may easily be extended to other contexts where consumers may share offers with other consumers. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A machine-implemented method for securing network-based access to an incentive value based on an incentive token configured to be shared between consumer devices, comprising:
   generating the incentive token for a promotion of a merchant, wherein the incentive token is associated with the incentive value;
   associating the incentive token with a first consumer account;
   providing, in a first communication, the incentive token to a first consumer device associated with the first consumer account via a network;
   subsequent to providing the incentive token to the first consumer device, receiving, in a second communication, the incentive token from a second consumer device associated with a second consumer account via the network;
   determining, by a processor, whether the second consumer account is authorized to receive the incentive value, wherein the determining whether the second consumer account is authorized to receive the incentive value includes:
      determining that the second consumer account is different from the first consumer account such that the first consumer account is prohibited from receiving the incentive value;
      determine that the first consumer account is unassociated with the second consumer device, wherein the first consumer account is unassociated with the second consumer device when the first consumer account has not previously provided the incentive token to the second consumer account and the second consumer account has not previously provided the incentive token to the first consumer account; and determining that the second consumer device is different from the first consumer device based on tracking device characteristics over the network for the first communication and second communication such that the second consumer account is prohibited from receiving the incentive value using the first consumer device;

in response to determining that (i) the second consumer device is different than the first consumer device, (ii) the first consumer account is unassociated with the second consumer device, (iii) the second consumer account is different than the first consumer account, enabling the second consumer account to receive the incentive value;

identifying the first consumer account based on the incentive token after receiving the incentive token from the second consumer device; and associating the first consumer account to the second consumer account indicating that the first consumer successfully recommended the promotion to the second consumer.

2. The machine-implemented method of claim 1, wherein the determining whether the second consumer account is authorized to receive the incentive value further comprises:

determining an incentive count indicating a number of incentives available for the incentive token before providing the incentive token to the first consumer device;

determining whether the incentive token count indicates that one or more incentives are available for the incentive token after receiving the incentive token from the second consumer device; and wherein the enabling of the second consumer account to receive the incentive value further requires the determination that the incentive count indicates that one or more incentives are available for the incentive token: where the machine-implemented method, further comprises:

reducing the incentive count for the incentive token.

3. The machine-implemented method of claim 1, further comprising:

associating the first consumer account with the second consumer account after receiving the incentive token from the second consumer device.

4. The machine-implemented method of claim 1, wherein the determining whether the second consumer account is authorized to receive the incentive value further comprises:

determining that the second consumer account was opened after the incentive token was received by the second consumer device; and identifying the second consumer account as new.

5. The machine-implemented method of claim 1, wherein determining whether the second consumer account is authorized to receive the incentive value includes determining whether the second consumer has purchased the promotion.

6. The machine-implemented method of claim 1, wherein determining whether the second consumer account is authorized to receive the incentive value includes determining whether the second consumer has redeemed the promotion.

7. The machine-implemented method of claim 1, wherein the device characteristics over the network include at least one of internet protocol (IP) address or media access control (MAC) address.

8. A system for securing network-based access to an incentive value based on an incentive token configured to be shared between consumer devices, comprising:

circuitry configured to:

generate the incentive token for a promotion of a merchant, wherein the incentive token is associated with the incentive value;

associate the incentive token with a first consumer account;

provide, in a first communication, the incentive token to a first consumer device associated with the first consumer account via a network;

subsequent to providing the incentive token to the first consumer device, receive, in a second communication, the incentive token from a second consumer device associated with a second consumer account via the network;

determine, by a processor, whether the second consumer account is authorized to receive the incentive value, wherein the determining whether the second consumer account is authorized to receive the incentive value includes:

determining that the second consumer account is different from the first consumer account such that the first consumer account is prohibited from receiving the incentive value;

determine that the first consumer account is unassociated with the second consumer device, wherein the first consumer account is unassociated with the second consumer device when the first consumer account has not previously provided the incentive token to the second consumer account and the second consumer account has not previously provided the incentive token to the first consumer account; and determining that the second consumer device is different from the first consumer device based on tracking device characteristics over the network for the first communication and second communication such that the second consumer account is prohibited from receiving the incentive value using the first consumer device;

in response to determining that (i) the second consumer device is different than the first consumer device, (ii) the first consumer account is unassociated with the second consumer device, (iii) the second consumer account is different than the first consumer account, enable the second consumer account to receive the incentive value;

identify the first consumer account based on the incentive token after receiving the incentive token from the second consumer device; and associate the first consumer account to the second consumer account indicating that the first consumer successfully recommended the promotion to the second consumer.

9. The system of claim 8, wherein the circuitry configured to determine whether the second consumer account is authorized to receive the incentive value further comprises circuitry configured to:

determine an incentive count indicating a number of incentives available for the incentive token before providing the incentive token to the first consumer device;

determine whether the incentive token count indicates that one or more incentives are available for the incentive token after receiving the incentive token from the second consumer device; and wherein the circuitry configured to enable the second consumer account to receive the incentive value further requires the determination that the incentive count indicates that one or more incentives are available for the incentive token, wherein the circuitry is further configured to:

reduce the incentive count for the incentive token.

10. The system of claim 8, where the circuitry is further configured to:
associate the first consumer account with the second consumer account after receiving the incentive token from the second consumer device.

11. The system of claim 8, wherein the circuitry configured to determine whether the second consumer account is authorized to receive the incentive value further comprises circuitry configured to:
determine that the second consumer account was opened after the incentive token was received by the second consumer device; and
identify the second consumer account as new.

12. The system of claim 8, wherein the circuitry configured to determine whether the second consumer account is authorized to receive the incentive value further comprises circuitry configured to:
determine whether the second consumer has purchased the promotion.

13. The system of claim 8, wherein the circuitry configured to determine whether the second consumer account is authorized to receive the incentive value further comprises circuitry configured to:
determine whether the second consumer has redeemed the promotion.

14. The system of claim 8, wherein the device characteristics over the network include at least one of internet protocol (IP) address or media access control (MAC) address.

15. A computer program product for securing network-based access to an incentive value based on an incentive token configured to be shared between consumer devices, comprising a non-transitory computer readable storage medium and computer program instructions stored therein, the computer program instructions comprising program instructions for:
generating the incentive token for a promotion of a merchant, wherein the incentive token is associated with the incentive value;
associating the incentive token with a first consumer account;
providing, in a first communication, the incentive token to a first consumer device associated with the first consumer account via a network;
subsequent to providing the incentive token to the first consumer device, receiving, in a second communication, the incentive token from a second consumer device associated with a second consumer account via the network;
determining, by a processor, whether the second consumer account is authorized to receive the incentive value, wherein the determining whether the second consumer account is authorized to receive the incentive value includes:
determining that the second consumer account is different from the first consumer account such that the first consumer account is prohibited from receiving the incentive value;
determine that the first consumer account is unassociated with the second consumer device, wherein the first consumer account is unassociated with the second consumer device when the first consumer account has not previously provided the incentive token to the second consumer account and the second consumer account has not previously provided the incentive token to the first consumer account; and
determining that the second consumer device is different from the first consumer device based on tracking device characteristics over the network for the first communication and second communication such that the second consumer account is prohibited from receiving the incentive value using the first consumer device;
in response to determining that (i) the second consumer device is different than the first consumer device, (ii) the first consumer account is unassociated with the second consumer device, (iii) the second consumer account is different than the first consumer account, enabling the second consumer account to receive the incentive value;
identifying the first consumer account based on the incentive token after receiving the incentive token from the second consumer device; and
associating the first consumer account to the second consumer account indicating that the first consumer successfully recommended the promotion to the second consumer.

16. The computer program product of claim 15, wherein the computer program instructions for determining whether the second consumer account is authorized to receive the incentive value further comprises computer program instructions for:
determining an incentive count indicating a number of incentives available for the incentive token before providing the incentive token to the first consumer device;
determining whether the incentive token count indicates that one or more incentives are available for the incentive token after receiving the incentive token from the second consumer device; and
wherein the computer program instructions for enabling of the second consumer account to receive the incentive value further requires the determination that the incentive count indicates that one or more incentives are available for the incentive token, and
wherein the computer program instructions further comprise computer program instructions for:
reducing the incentive count for the incentive token.

17. The computer program product of claim 15, wherein the computer readable storage medium further comprises computer program instructions comprising program instructions for:
associating the first consumer account with the second consumer account after receiving the incentive token from the second consumer device.

18. The computer program product of claim 15, wherein the computer program instructions for determining whether the second consumer account is authorized to receive the incentive value further comprises computer program instructions for:
determining that the second consumer account was opened after the incentive token was received by the second consumer device; and
identifying the second consumer account as new.

19. The computer program product of claim 15, wherein the computer program instructions for determining whether the second consumer account is authorized to receive the incentive value further comprises computer program instructions for:
determining whether the second consumer has purchased the promotion.

20. The computer program product of claim 15, wherein the computer program instructions for determining whether the second consumer account is authorized to receive the incentive value further comprises computer program instructions for:

determining whether the second consumer has redeemed the promotion.

21. The computer program product of claim 15, wherein the device characteristics over the network include at least one of internet protocol (IP) address or media access control (MAC) address.

* * * * *